Figure 11:
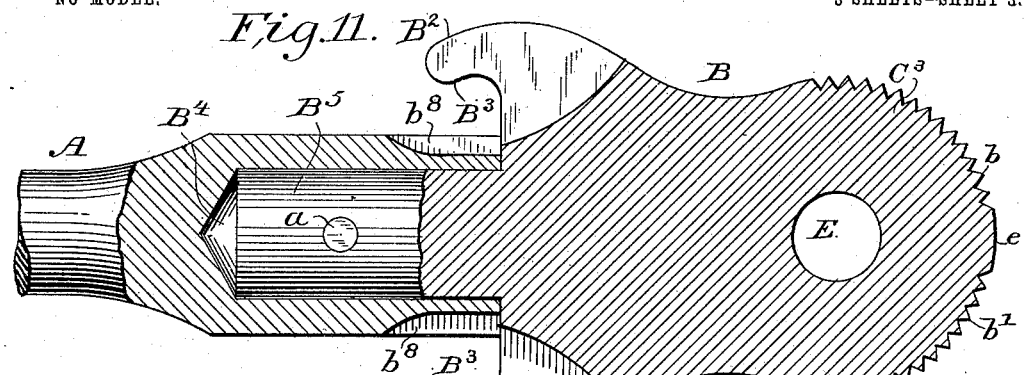

No. 743,058. PATENTED NOV. 3, 1903.
G. W. BUFFORD.
CHAIN WRENCH.
APPLICATION FILED JULY 7, 1902.
NO MODEL. 3 SHEETS—SHEET 1.
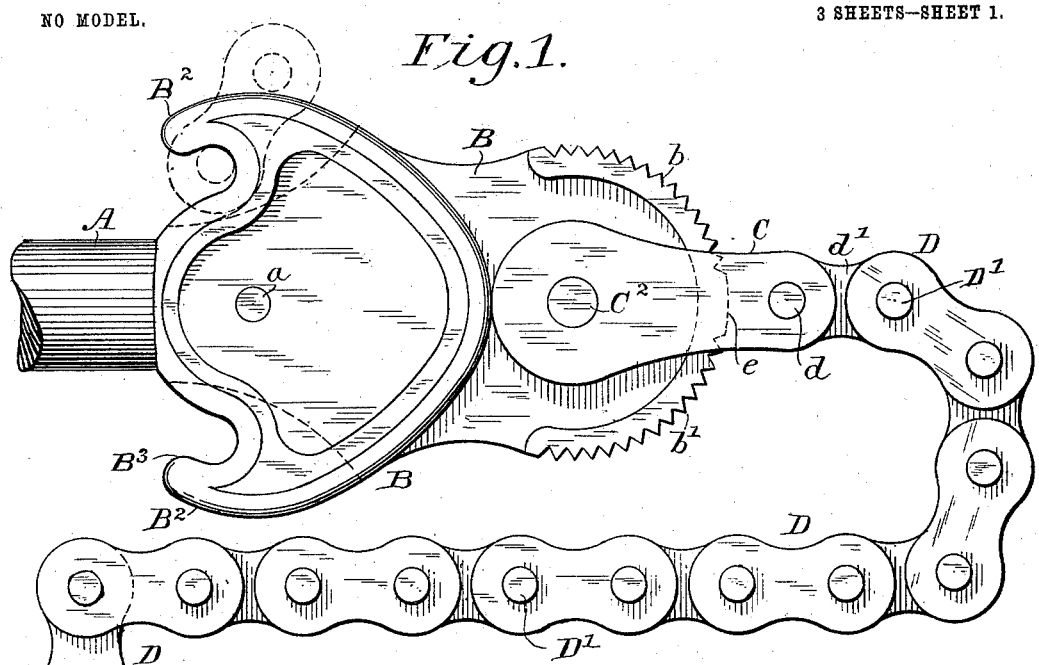
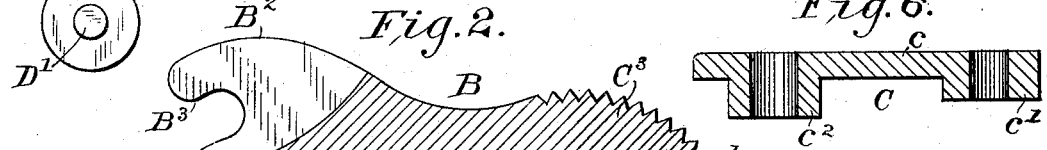
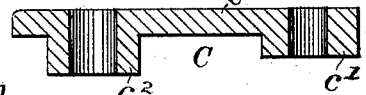
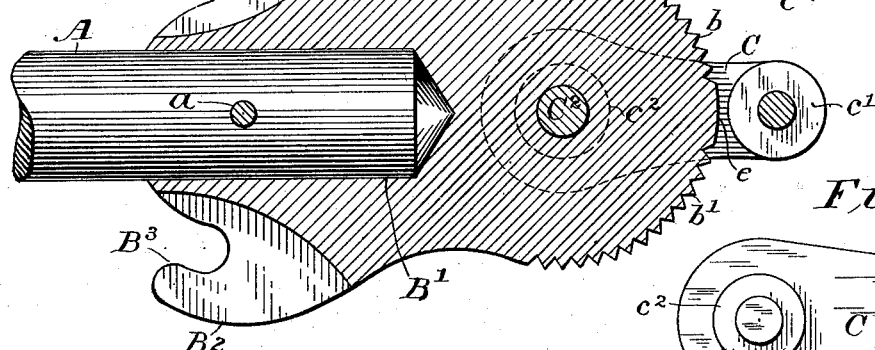
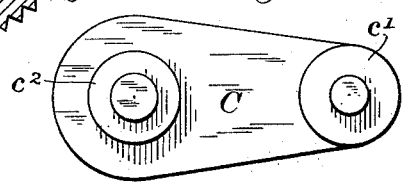
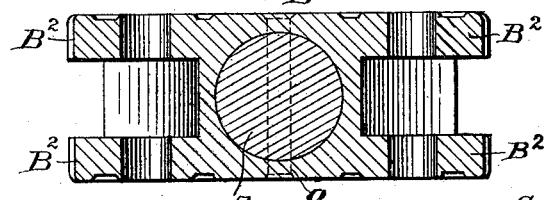
Witnesses
Jos. S. Latimer
F. A. McDermott
Inventor
George W. Bufford
by [signature]
his Attorney

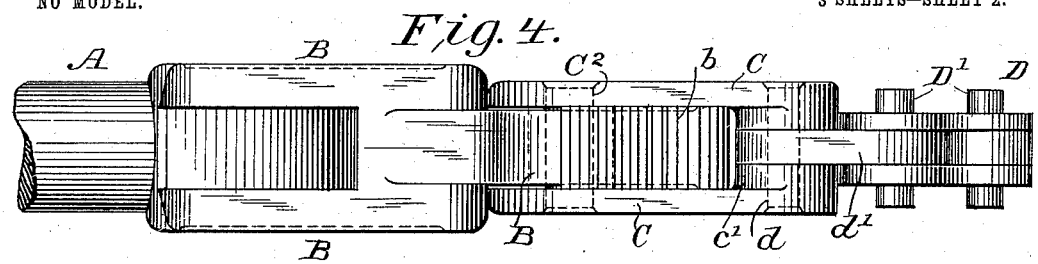
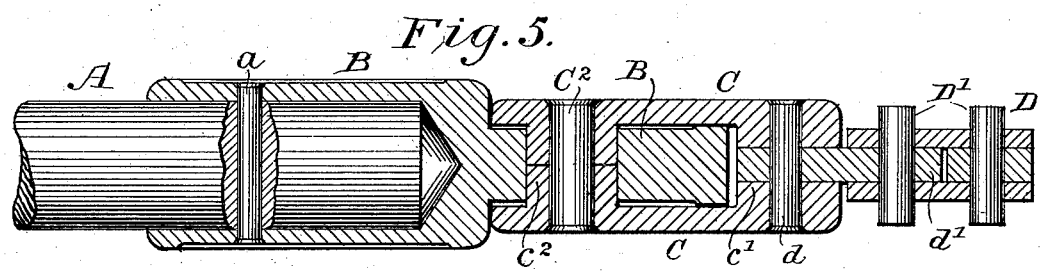
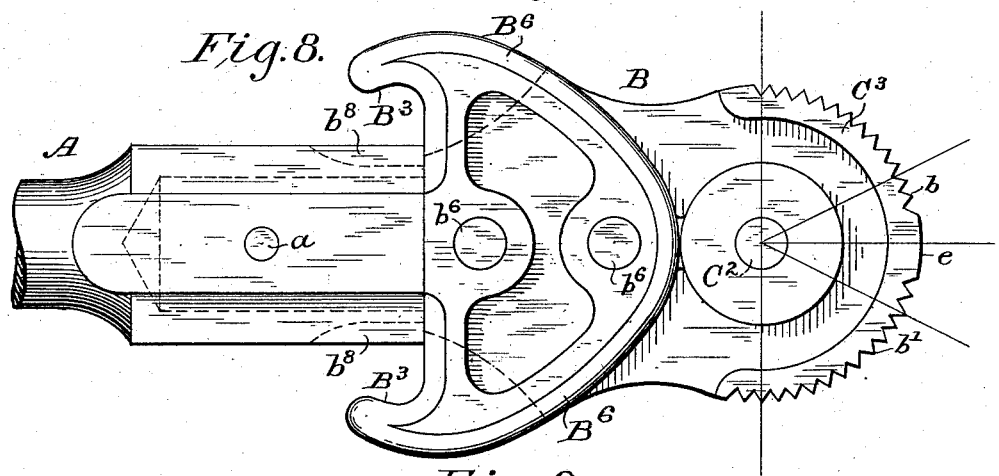
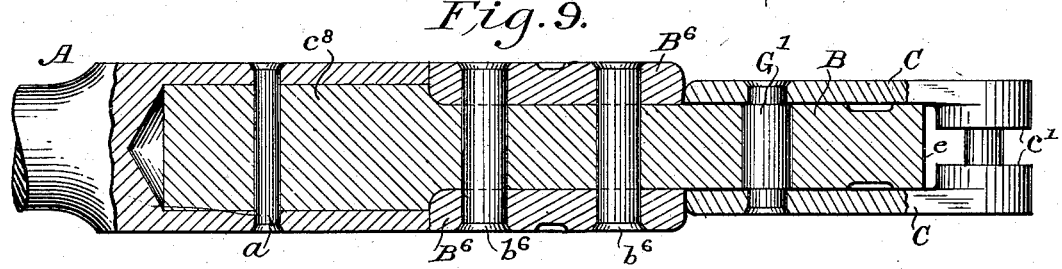
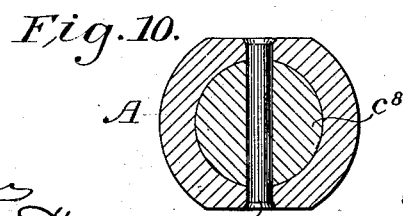

No. 743,058. PATENTED NOV. 3, 1903.
G. W. BUFFORD.
CHAIN WRENCH.
APPLICATION FILED JULY 7, 1902.
NO MODEL. 3 SHEETS—SHEET 3.

Witnesses
Jno. S. Latimer
F. A. McDermott

Inventor
George W. Bufford
by Arthur B. Brown
his Attorney

THE NORRIS PETERS CO., PHOTO-LITHO., WASHINGTON, D. C.

No. 743,058. Patented November 3, 1903.

UNITED STATES PATENT OFFICE.

GEORGE W. BUFFORD, OF BROOKLYN, NEW YORK, ASSIGNOR TO J. H. WILLIAMS AND COMPANY, OF BROOKLYN, NEW YORK, A CORPORATION OF NEW YORK.

CHAIN WRENCH.

SPECIFICATION forming part of Letters Patent No. 743,058, dated November 3, 1903.

Application filed July 7, 1902. Serial No. 114,541. (No model.)

*To all whom it may concern:*

Be it known that I, GEORGE W. BUFFORD, of the borough of Brooklyn, county of Kings, city and State of New York, have invented certain new and useful Improvements in Chain Wrenches, of which the following is a specification.

This invention relates to an improvement in pipe-wrenches, and more particularly to that class of wrenches known as "chain" wrenches; and the invention is embodied in the construction and arrangement of parts presently to be described, and defined in the claims.

The present art of chain pipe-wrenches includes such types and styles of wrenches as shown in United States Letters Patent No. 570,213, dated October 27, 1894; No. 570,214, dated October 27, 1894; No. 577,653, dated February 23, 1897; No. 577,654, dated February 23, 1897, and No. 698,779, dated April 29, 1902, all of which illustrate a well-known type of wrench. Of the various types of chain wrenches there are those known as the "single-course flat-link" chain wrench—that is, a wrench having a chain formed of alternate single and double flat links and in connection with such a chain two separated jaws between which the end of the chain is pivoted. There is also what is known as the "double-course" chain—that is, a construction wherein a flat-link chain is employed on opposite sides of a head. There has also been suggested a construction wherein a single-course flat-link chain is to be employed with a single serrated head, and it is to this latter type of wrench more particularly that some of the features of the present invention relate.

The object of the present invention is largely the production of a wrench of the type shown in the above-recited patents wherein a single-course flat-link chain can be employed with a single head as distinguished from a double head and which will embody features rendering the same convenient for use in connection with all classes of work—such as pipe, nipple, or T work—which will be economical in its construction, strong in its various parts, and one which will have a wide range for gripping a pipe or other article firmly and positively.

Other objects of the invention will presently be stated.

While the invention as shown and described is of the single-course flat-link chain type, it is to be understood that various features hereinafter described can be employed with other types of chain wrenches and that in addition to the modifications hereinafter described other modifications and changes can be made without departing from the spirit of the invention.

Figure 14:
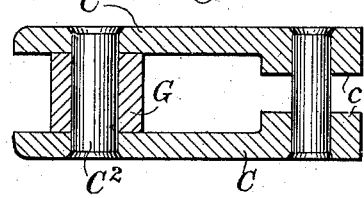
Figure 12:
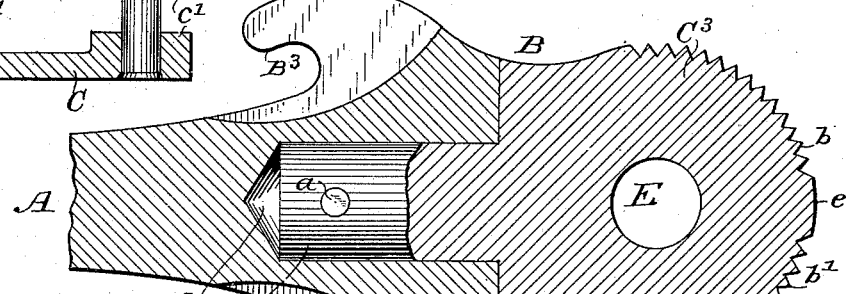
Figure 15:
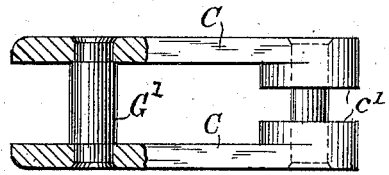
Figure 13:
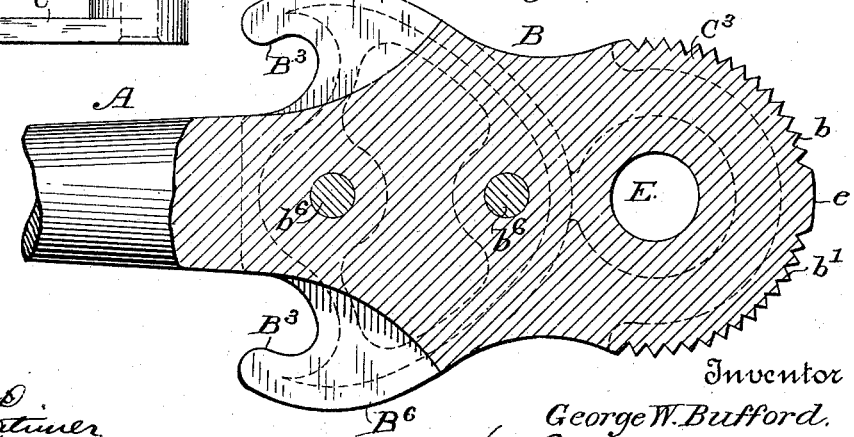

In the accompanying drawings, Figure 1 is a side elevation of a wrench, the same showing the handle portion broken away. Fig. 2 is a similar view showing the head in longitudinal section. Fig. 3 is a view in cross-section extending through the chain-engaging hooks. Fig. 4 is an edge view. Fig. 5 is a longitudinal section at right angles to that shown in Fig. 2. Fig. 6 is a section through one of the pivot-links. Fig. 7 is an elevation of the pivot-link. Fig. 8 is a side elevation of a wrench-head having the pivot-links removed and illustrating a modified construction. Fig. 9 is a longitudinal transverse section through the construction shown in Fig. 8. Fig. 10 is a cross-section extending through the rivet connecting the head and handle. Fig. 11 is a sectional elevation of a slightly-modified form of head and handle. Fig. 12 is another modified form having the removable head and hooks integral with the handle. Fig. 13 is a longitudinal section of a modified form having the head and handle as integral with removable hook portions or members. Figs. 14 and 15 are sectional views of modified form of pivot-links.

In the commercial form of wrench it is now recognized that strength and rigidity of the head part is an important factor. It is also desirable to form a connection between the handle and head in such a manner that there will be no possibility of independent movement or play between the two members. It is also desirable to have the parts fashioned in a manner that they may be readily constructed by drop-forging or by other modern means. In the construction of a wrench as shown in the figures presently to be referred to it has been the aim to meet the above requirements.

A designates a handle, conveniently of metal and of cylindrical formation.

B designates a head which may be termed a "single-piece" head, the same being constructed conveniently of a single piece of metal having its outer end fashioned to approximate a segment of a circle, the edges of which are provided with a series of gripping teeth or serrations $b\ b'$. The opposite end or portion of the head is formed with a recess B', fashioned to receive the end of the handle A, which is secured in the recess or socket by a cross-pin $a$ or other convenient means. The head B is grooved longitudinally on opposite sides of the socket portion, forming thereby oppositely-arranged flanges $B^2$, the rear edges of which are undercut to form hooks $B^3$ on the extreme rear portions of the flanges. These hooks are curved and spaced apart on the respective sides of the head in a well-known manner. The parts thus described constitute, in effect, two independent members, namely—the handle and the head.

It has been heretofore suggested to form a head with serrations on opposite sides, which constitute the gripping-surfaces, and to enable the wrench to be used in connection with conditions or positions which require minute changes in gripping-points the sets of hooks have been arranged out of alinement with each other. This has been inconvenient from a manufacturing point and also from the fact that the proper relative positioning is quite difficult to secure. In the present construction of head the arrangement of the gripping-surfaces relatively to each other is such that as the teeth or serrations $b$ engage a pipe at certain points a reversal of the head will cause the teeth $b'$ on the reverse side to engage the pipe at places between those points where it was engaged by the opposite teeth or serrations $b$. By referring to Fig. 8 this feature of the invention will more readily be apparent by the lines radiating from the pivot center, indicating what may be termed a "relatively-staggered arrangement" of the teeth—that is to say, the teeth $b'$ are located from a straight line running through the pivot centrally and longitudinally through the head a distance greater than that of teeth $b$, which unequal distance is substantially one-half the distance between any two teeth. Thus upon the reversal of the wrench the teeth on one side will always grasp the pipe or member between the points where it had been grasped by the teeth of the opposite side. This arrangement of the teeth is regarded as important. Another feature of the jaw or teeth portion of the head is its substantially circular formation, which in connection with the solid attachment of the head portion and the handle serves to form a very powerful and uniform gripping-surface from all points of adjustment from a full right angle to at or near the end and also permits the use of teeth of uniform V shape. It has been found convenient to form the jaw portion of the head of a width slightly less than that of the rear portion of the head, as shown in Figs. 4 and 5, thereby forming an enlarged or thickened portion for the connection between the head and the handle. Such construction is also advantageous in that the pivot-links C of the chain D may have a full movement across the jaw proper and are prevented from swinging back to a point near the hooks.

In the type of wrench above described it will be observed that an essential requirement is to prevent the pivotal links from coming in contact with the teeth of the jaw either while the wrench is in use or otherwise. It is also desirable to have an equal range of movement of the chain on opposite sides of the jaw and finally to secure a positive grip with any of the various teeth of the jaw. To accomplish this result, pivot-links C are employed. Each link is formed of a bar $c$, tapering toward its outer end and terminating in an enlargement $c'$, which constitutes a boss at the side of the end of the link, through which a suitable perforation is made. The opposite or large end of each link has a boss $c^2$, through which is a perforation. The bosses $c^2$ on the opposite links are designed to meet end to end when passed through the pivot-opening E in the head. This pivot-opening is located at the center of the jaw, and the bosses $c^2$ are fashioned to fit loosely in the opening, so as to turn readily. The two links are held in their proper position on opposite sides of the head by a headed pin $C^2$ or other convenient means, and owing to the meeting of the bosses $c^2$ the links are prevented from binding against the sides of the head.

The chain D is conveniently formed of flat links, alternately single and double. The single end link $d$ is placed between the bosses $c'$ of the pivotal links C and there pivotally secured by a pintle $d$, the bosses resting against the sides of the link $d'$. As will be observed, this method of securing the chain to the pivot-links insures a maintenance of the proper spacing of the outer ends of the links C and prevents them coming in contact with the sides of the jaws and the teeth thereof. While the chain-links are stated as being alternately single and double, it is to be understood that they may be composed of a plurality of links arranged side by side—that is to say, a single link may be made up of two or more links in a well-known manner. The various links of the chain are united by pintles D', the ends of which project to engage the hooks of the head. Other forms of links can be employed, and the structure can be arranged for use with a cable-chain, if desired.

In the construction and arrangement above described it will be observed that a very strong, serviceable, and convenient instrument is produced. The connection between the handle and the wrench-head is simple and at the same time provides a long or extended engagement, the socket B' entering well in toward the jaw. A somewhat similar connection may be made as shown in Fig. 11, differing, however, in that the end of the handle is socketed, as at B⁴, while a shank or cylindrical extension B⁵ is made on the head B. A still further variation of the construction is that shown in Fig. 12, wherein the head proper and the handle are made integral, the jaw (indicated at C³ in this figure) being a separate member and secured fixedly to the head by having a cylindrical projection C⁴ entering a socket C⁵ in the head. A still further modification of the construction is shown in Fig. 13, wherein the head, jaw, and handle are made integral. In this particular construction the hooks B³ are formed on removable plates B⁶, lying on or secured to the opposite sides or faces of the head by suitable pins b⁶. The construction of a wrench of this type with removable hook portions is advantageous in that hooks of varying degrees of curvature can be employed, and when the hooks are worn or battered they can be readily replaced. The preferred construction of the removable hook portions is shown in Figs. 8, 9, and 10, wherein side plates B⁶ are riveted or secured directly on the sides of the head in any suitable manner, and in this connection the head proper is formed with a cylindrical extension C⁸, entering a cavity in the end of the handle A, the same being secured in any suitable manner. In this construction, as well as the construction shown in Fig. 13, the sides of the head proper are cut away, as shown in dotted lines in Fig. 8, so as to form a clearance or space b⁸ between the hooks B³ of the plate B⁶, into which space the chain is extended when the wrench is in use.

Various changes in the method of retaining the pivot-links in their proper relative positions can be employed, and in Figs. 14 and 15 are shown modified forms of such structure. In Fig. 14 the pivot-links C are spaced apart by a bushing G, which is designed to be loosely fitted in the pivot-opening of the jaw. The two members are then secured together by a suitable pin C². In Fig. 15 a somewhat similar construction is shown, with the exception that the bushing G' is made as an integral part of the pin.

In the construction and arrangement above described it will be observed that the end or center of the jaw is preferably left plain or without teeth, while the serrated edges on opposite sides of this portion are concentric. This feature, together with the pivoting of the links at the center of the jaw, is important in that a positive grip can be had on the pipe throughout the extent of the gripping edge, while the danger of securing a leverage sufficiently great to break the pipe by gripping it at the end of the jaw is avoided. The advantages of the pivot-link construction described will be readily apparent in that the links are prevented from being bent or binding on the jaws, and by the length of the pivot-links and their range of movement pipes may be gripped effectively throughout the entire gripping edge of the jaw. It will also be observed that in the construction the head is solid and relatively narrow and that the chain through its double-link portion is substantially the width of the jaw. This enables a nipple to be readily grasped between the chain and the jaw, and this whether the nipple is as long as the width of the jaw or less. The curvature of the jaw, together with the pivotal center of the pivot-links, results in securing the necessary and positive gripping throughout the various angles which the wrench may be positioned in.

It is to be understood that so far as the present invention is concerned it is the first wherein a narrow single-piece jaw can be employed with a single-course chain so that direct pressure between the chain and jaw on the pipe or nipple can be secured at any point throughout the extent of the gripping face or faces of the jaw.

It will be noted that the chain is reversible, so that the wrench can be used either side up, and that the projecting locking-pintles D' extend throughout the chain except only where the holding-pintle d is employed. Therefore the chain itself is reversible, terminating at both ends in the initial links d'. When the chain becomes worn, the holding-pintle d can be knocked out and the chain reversed end for end, thus bringing other parts into use, and hence lengthening the life of the wrench.

Having thus described the invention, what is claimed as new, and desired to be secured by Letters Patent, is—

1. A chain pipe-wrench having a jaw with relatively staggered series of teeth on its opposite edges.

2. A chain pipe-wrench having a jaw with a plain central edge portion and serrated opposite edge portions, the serrations on one edge being staggered in relation to those on the opposite edge.

3. A chain pipe-wrench having, in combination, a jaw having serrations on opposite edges arranged in relatively staggered positions, pivot-links centrally pivoted to the jaw and projecting beyond the same, and a chain attached to the links.

4. A chain pipe-wrench having, in combination, a segmental jaw having serrations on its edges arranged in relatively staggered positions, pivot-links centrally pivoted to the jaw, a chain connected to the links, and hooks with which the chain engages.

5. A chain pipe-wrench having, in combination, a serrated pipe-gripping jaw, separate hook-plates secured on opposite sides of the wrench and extending laterally beyond the respective sides of said jaw, and a chain cooperating with and opposed to the serrations of said jaw to squarely grip a pipe between them and adapted to swing between and to engage the hooks on said hook-plates.

6. A chain pipe-wrench, having an end-to-end reversible chain with projecting locking-pintles throughout its length and a readily-removable pin connecting said chain to the wrench.

7. A chain pipe-wrench having, in combination, a handle, a single head with a segmental jaw serrated on its opposite edges, pivot-links centrally pivoted to the jaw on opposite sides thereof, said links extending outwardly beyond all portions of the periphery of said jaw, a single-course double-acting flat-link chain pivotally connected to the outer end of said pivot-links and beyond all portions of the periphery of the jaw, said chain and the serrations of said jaw being opposed to each other so that when in use they embrace squarely between them the article to be turned, and spaced hooks at opposite sides of the wrench between which the chain extends and with which the chain engages, said handle, head, jaw and hooks being rigidly connected and relatively immovable during the operation of the wrench.

8. A chain pipe-wrench having, in combination, a handle, a single head with a segmental jaw serrated on its opposite edges, pivot-links centrally pivoted to the jaw on opposite sides thereof, said links extending outwardly beyond all portions of the periphery of said jaw, a single-course double-acting chain pivotally connected to the outer ends of said pivot-links and beyond all portions of the periphery of the jaw, said chain and the serrations of the jaw being opposed to each other so that when in use they embrace squarely between them the article to be turned, and hooks at opposite sides of the wrench with which the chain engages, said handle, head, jaw and hooks being rigidly connected and relatively immovable during the operation of the wrench.

9. A chain pipe-wrench having, in combination, a jaw having serrated edges and a central opening, pivot-links on opposite sides of the jaw having bosses at both ends, the bosses at their inner ends passing into the opening in the jaw and abutting against each other, a pin passing through said bosses for securing the links to the jaw, a chain-link interposed between the outer bosses of said links, and a pin for securing said chain-link between said bosses.

10. A chain pipe-wrench having, in combination, a serrated single jaw having a centrally-disposed opening, pivot-links on opposite sides of the jaw having bosses at their inner ends projecting into said opening and abutting against each other, a pin for securing the links to the jaw, a chain, and a connection between the outer ends of the links and the chain.

11. A chain pipe-wrench having, in combination, a serrated jaw having a pivot-opening therein, pivot-links on opposite sides of the jaw having bosses on their inner faces and at both ends, the bosses on the inner ends of said links entering said pivot-opening, means for securing the links to the jaw, and a chain secured between the bosses at the outer ends of the links.

12. A chain pipe-wrench having, in combination, a jaw having engaging serrations on opposite edges, pivot-links on opposite sides of said jaw having their inner ends pivotally secured at the center of the jaw, means independent of and additional to the jaw at both the inner and the outer ends of the pivot-links for spacing the links apart and thereby preventing the same from coming in contact with the sides of the jaw, and a chain connected to the free ends of said links.

13. A chain pipe-wrench having, in combination, a single jaw having oppositely-arranged teeth, pivot-links on opposite sides of the jaw having their inner ends pivotally secured at the center of the jaw, means independent of and additional to the jaw for spacing the links apart and thereby preventing their engaging the sides of the jaw and a single-course chain connected with and between the free ends of said pivot-links and coöperating with said jaw, said chain and the teeth of said jaw being opposed to each other so that when in use they embrace squarely between them the article to be turned.

In witness whereof I have hereunto signed my name in the presence of two subscribing witnesses.

GEORGE W. BUFFORD.

Witnesses:
WM. J. CAMPBELL,
FRANK W. TRABOLD.